US012652238B2

(12) United States Patent
Bai et al.

(10) Patent No.: US 12,652,238 B2
(45) Date of Patent: Jun. 9, 2026

(54) FLOW SCHEDULING FOR MACHINE LEARNING WORKLOADS

(71) Applicant: Microsoft Technology Licensing, LLC, Redmond, WA (US)

(72) Inventors: Wei Bai, Redmond, WA (US); Ranveer Chandra, Kirkland, WA (US); Philipp Andre Witte, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 18/647,132

(22) Filed: Apr. 26, 2024

(65) Prior Publication Data

US 2025/0337682 A1      Oct. 30, 2025

(51) Int. Cl.
| | |
|---|---|
| *H04L 45/00* | (2022.01) |
| *H04L 45/24* | (2022.01) |
| *H04L 45/28* | (2022.01) |
| *H04L 47/125* | (2022.01) |
| *H04L 47/62* | (2022.01) |
| *H04L 69/22* | (2022.01) |

(52) U.S. Cl.
CPC .............. *H04L 45/38* (2013.01); *H04L 45/24* (2013.01); *H04L 45/28* (2013.01); *H04L 47/125* (2013.01); *H04L 47/6225* (2013.01); *H04L 69/22* (2013.01)

(58) Field of Classification Search
None
See application file for complete search history.

(56) References Cited

U.S. PATENT DOCUMENTS

2022/0417139 A1*  12/2022  Brar ...................... H04L 45/745
2023/0026370 A1*  1/2023  Amiri ................... H04L 45/123

FOREIGN PATENT DOCUMENTS

WO      2023081152 A1    5/2023
WO      2023136964 A1    7/2023

OTHER PUBLICATIONS

Touvron, et al., "LLaMA: Open and Efficient Foundation Language Models", In repository of arXiv:2302.13971v1 [cs.CL], Feb. 27, 2023, 27 pages.
Vanini, et al., "Let it flow: Resilient asymmetric load balancing with flowlet switching", In 14th USENIX Symposium on Networked Systems Design and Implementation, 2017, pp. 407-420.
Wang, et al., "Blink: Fast and Generic Collectives for Distributed ml", In Proceedings of the 3rd ML System Conference, Mar. 2, 2020, 15 Pages.

(Continued)

*Primary Examiner* — Bryan Y Lee
(74) *Attorney, Agent, or Firm* — Ray Quinney & Nebeker P.C.; Tiffany B. Healy

(57) ABSTRACT

The present disclosure relates to systems and methods for flow scheduling of machine learning workloads. The systems and methods use prior knowledge of the traffic patterns for machine learning workloads and the network topology to schedule the flows of the machine learning workloads. A centralized controller leverages the knowledge of the traffic patterns for the machine learning workloads to guide per-flow routing decisions for the machine learning workflows to schedule the flows across all available network paths to fully utilize network bandwidth capacity.

20 Claims, 6 Drawing Sheets

(56) References Cited

OTHER PUBLICATIONS

Wang, et al., "Optimized network architectures for large language model training with billions of parameters", In repository of arXiv:2307.12169, Jul. 22, 2023, 08 Pages.

Wang, et al., "Overlap communication with dependent computation via decomposition in large deep learning models", In Proceedings of the 28th ACM International Conference on Architectural Support for Programming Languages and Operating Systems, vol. 1, Mar. 25, 2023, pp. 93-106.

Wang, et al., "TopoOpt: Co-optimizing network topology and parallelization strategy for distributed training jobs", In 20th USENIX Symposium on Networked Systems Design and Implementation, Apr. 17, 2023, pp. 739-767.

Wang, et al., "Zero++: Extremely efficient collective communication for giant model training", In repository of arXiv:2306.10209, Jun. 16, 2023, 12 Pages.

You, et al., "Large batch optimization for deep learning: Training bert in 76 minutes", In repository of arXiv preprint arXiv:1904.00962, Sep. 25, 2019, 37 Pages.

Yu, et al., "Double quantization for communication-efficient distributed optimization", Advances in neural information processing systems, 32, 2019, 12 Pages.

Zhang, et al., "Resilient datacenter load balancing in the wild", In Proceedings of the Conference of the ACM Special Interest Group on Data Communication, Aug. 21, 2017, pp. 253-266.

Zheng, et al., "Asynchronous stochastic gradient descent with delay compensation", In International Conference on Machine Learning, 2017, pp. 4120-4129.

Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.

"Broadcom Cognitive routing in the tomahawk 5 data center switch", Retrieved From: https://www.broadcom.com/blog/cognitive-routing-in-the-tomahawk-5-data-center-switch, Feb. 1, 2023, 03 Pages.

"Building AI/ML Networks with Cisco Silicon One", Retrieved From: https://blogs.cisco.com/sp/building-ai-ml-networks-with-cisco-silicon-one, Retrieved on: May 26, 2023, 14 Pages.

"Doubling all2all performance with nvidia collective communication library 2.12", Retrieved From: https://developer.nvidia.com/blog/doubling-all2all-performance-withnvidia-collective communicationlibrary-2-12/, Retrieved on: Feb. 28, 2022, 14 Pages.

"NCCL: Optimized primitives for inter-GPU communication", Retrieved From: https://github.com/nvidia/nccl, Retrieved on: Jun. 6, 2025, 04 Pages.

"Nvidia's InfiniBand Problem-Spectrum-X AI Fabric, Tomahawk-5, Jericho-3AI, Quantum-2-SemiAnalysis", Retrieved from: https://semianalysis.com/2023/05/28/nvidias-infiniband-problem-qmx-ai/, Retrieved on: May 28, 2023, 05 Pages.

"NVIDIA—Scaling language model training to a trillion parameters using megatron", Retrieved From: https://developer.nvidia.com/blog/scaling-language-model-training-to-a-trillion-parameters-using-megatron/, Retrieved on: Apr. 12, 2021, 24 Pages.

"Performance reported by nccl tests", Retrieved From: https://github.com/NVIDIA/nccl-tests/blob/master/doc/PERFORMANCE.md, Retrieved on: Jun. 6, 2025, 05 Pages.

"RCCL double binary tree constructor", Retrieved From: https://github.com/ROCm/rccl/blob/rocm-5.7.1/src/graph/trees.cc, Retrieved on: Jun. 6, 2025, 03 Pages.

"RCCL topology model" https://github.com/ROCmSoftwarePlatform/rccl/blob/rocm5.7.1/src/graph/romemodels.cc#L567, Retrieved on: Jun. 6, 2025, 32 Pages.

"RCCL: ROCm Communication Collectives Library", Retrieved From:https://github.com/ROCm/rccl, Retrieved on: Jun. 6, 2025, 04 Pages.

"Virtual Chassis Fabric-Archives", Retrieved From: https://www.juniper.net/documentation/us/en/internal/archives/topics/concept/virtual-chassis-fabric-archives.html, 2024, 985 Pages.

Agrawal et al., "Empowering azure storage with {RDMA}", In 20th USENIX Symposium on Networked Systems Design and Implementation, 2023, pp. 49-67.

Al-Fares et al., "Hedera: Dynamic Flow Scheduling for Data Center Networks," NSDI'10 In Proceedings of the 7th USENIX Conference on Networked Systems Design and Implementation, Apr. 28-30, 2010, 15 pp.

Ai-Fares,.et al., "A scalable, commodity data center network architecture", ACM SIGCOMM computer communication review, 2008, pp. 63-74.

Alizadeh et al., "CONGA: Distributed Congestion-Aware Load Balancing for Datacenters," SIGCOMM '14, Proceedings of the 2014 ACM Conference on SIGCOMM, Aug. 17- 22, 2014, pp. 503-514.

Brown, et al., "Language Models are Few-Shot Learners", In Journal of Advances in neural information processing systems, vol. 33, 2020, 25 Pages.

Cai, et al., "Synthesizing optimal collective algorithms", In Proceedings of the 26th ACM SIGPLAN Symposium on Principles and Practice of Parallel Programming, Jan. 4, 2021, pp. 62-75.

Cao, et al., "Per-packet loadbalanced, low-latency routing for closbased data center networks", In Proceedings of the Ninth ACM Conference on Emerging Networking Experiments and Technologies, 2013, pp. 49-60.

De et al., "Flare: Flexible in-network allreduce", In Proceedings of the International Conference for High Performance Computing, Networking, Storage and Analysis, Jun. 29, 2021, pp. 1-16.

Even, et al., "On The Complexity Of Time Table And Multi-Commodity Flow Problems", In 16th annual symposium on foundations of computer science, 1975, pp. 184-193.

Fei, et al., "A Efficient sparse collective communication and its application to accelerate distributed deep learning" In Proceedings of the 2021 ACM SIGCOMM, 2021, pp. 676-691.

Firestone, et al., "Azure Accelerated Networking: SmartNICs in the Public Cloud", In Proceedings of 15th USENIX Symposium on Networked Systems Design and Implementation, Apr. 9, 2018, pp. 51-66.

Gebara, et al., "In-network aggregation for shared machine learning clusters" In Proceedings of Machine Learning and Systems, 2021, pp. 829-844.

Ghorbani, et al., "Drill: Micro load balancing for lowlatency data center networks", In Proceedings of the Conference of the ACM Special Interest Group on Data Communication, 2017, pp. 225-238.

Goyal, et al., "Accurate, Large Minibatch SGD: Training ImageNet in 1 Hour", In Repository of arXiv:1706.02677v1, Jun. 8, 2017, 12 Pages.

Graham, et al., "Scalable hierarchical aggregation protocol (sharp): A hardware architecture for efficient data reduction", In 2016 First International Workshop on Communication Optimizations in HPC (COMHPC), 2016, pp. 1-10.

He, et al., "Presto: Edge-based load balancing for fast datacenter networks", ACM SIGCOMM Computer Communication Review, 45(4), 2015, pp. 465-478.

Hong, et al., "Achieving High Utilization with Software-Driven WAN", In Proceedings of ACM SIGCOMM, Aug. 27, 2013, pp. 15-26.

Hu, et al., "Explicit path control in commodity data centers: Design and applications", In 12th USENIX Symposium on Networked Systems Design and Implementation (NSDI 15), 2015, pp. 15-28.

International Search Report and Written Opinion received for PCT Application No. PCT/US2025/015163, mailed on May 19, 2025, 15 pages.

Ivkin, et al., "Communication-efficient distributed SGD with sketching", Advances in Neural Information Processing Systems, 32, 2019, 11 Pages.

Jain, et al., "B4: Experience with a Globally-Deployed Software Defined WAN", In Proceedings of the ACM SIGCOMM Conference on SIGCOMM, Aug. 12, 2013, pp. 3-14.

Jiang, et al., "A linear speedup analysis of distributed deep learning with sparse and quantized communication", 32nd Conference on Advances in Neural Information Processing Systems, 31, 2018, 12 Pages.

Jouppi, et al., "Tpu v4: An optically reconfigurable supercomputer for machine learning with hardware support for embeddings", In

(56) References Cited

OTHER PUBLICATIONS

Proceedings of the 50th Annual International Symposium on Computer Architecture, 2023, pp. 1-14.

Kabbani, et al., "FlowBender: Flow-level Adaptive Routing for Improved Latency and Throughput in Datacenter Networks", In Proceedings of the 10th ACM International on Conference on Emerging Networking Experiments and Technologies, Dec. 2, 2014, pp. 149-159.

Khalili, et al., "Mptcp is not pareto-optimal: Performance issues and a possible solution", IEEE/ACM Transactions On Networking, 2013, 15 Pages.

Lao, et al., {ATP}: In-network aggregation for multi-tenant learning. In 18th USENIX Symposium on Networked Systems Design and Implementation (NSDI 21), 2021, pp. 741-761.

Li, et al., "1-Bit lamb: communication efficient large-scale large batch training with lamb's convergence speed", In 2022 IEEE 29th International Conference on High Performance Computing, Data, and Analytics (HiPC), 2022, pp. 272-281.

Li, et al., "Pytorch distributed: Experiences on accelerating data parallel training.", In repository of arXiv:2006.15704, Jun. 28, 2020, pp. 1-14.

Lian, et al., "Asynchronous parallel stochastic gradient for nonconvex optimization" Advances in neural information processing systems, 28, 2015, 09 Pages.

Narayanan, et al., "PipeDream: Generalized Pipeline Parallelism for DNN Training", In Proceedings of the 27th ACM Symposium on Operating Systems Principles, Oct. 27, 2019, 15 Pages.

Pioro, et al., "On efficient max-min fair routing algorithms", In Proceedings of the Eighth IEEE International Symposium on Computers and Communications, Jul. 3, 2003, 08 Pages.

Qureshi et al., "PLB: congestion signals are simple and effective for network load balancing", In Proceedings of the ACM SIGCOMM 2022 Conference, Aug. 22, 2022, pp. 207-218.

Rashidi, et al., "Themis: A network bandwidth-aware collective scheduling policy for distributed training of dl models", In Proceedings of the 49th Annual International Symposium on Computer Architecture, Jun. 18, 2022, pp. 581-596.

Rasley, et al., "Deepspeed: System optimizations enable training deep learning models with over 100 billion parameters", In Proceedings of the 26th ACM SIGKDD International Conference on Knowledge Discovery & Data Mining, Aug. 23, 2020, pp. 3505-3506.

Sapio et al., "Scaling distributed machine learning with {In-Network} aggregation", In 18th USENIX Symposium on Networked Systems Design and Implementation, Apr. 12, 2021, pp. 785-808.

Shah et al., "{TACCL}: Guiding collective algorithm synthesis using communication sketches", In 20th USENIX Symposium on Networked Systems Design and Implementation, Apr. 17, 2023, pp. 593-612.

Shoeybi, et al., "Megatron-LM: Training Multi-Billion Parameter Language Models Using GPU Model Parallelism", In Repository of arXiv:1909.08053v1, Sep. 17, 2019, 15 Pages.

Song, et al., "Network load balancing with in-network reordering support for rdma", In Proceedings of the ACM SIGCOMM 2023 Conference, Sep. 10. 2023, pp. 816-831.

Tang, et al., "1-bit adam: Communication efficient large-scale training with adam's convergence speed", In International Conference on Machine Learning, 2021, 12 Pages.

* cited by examiner

100

102

(a) AllGather                    (b) AllReduce

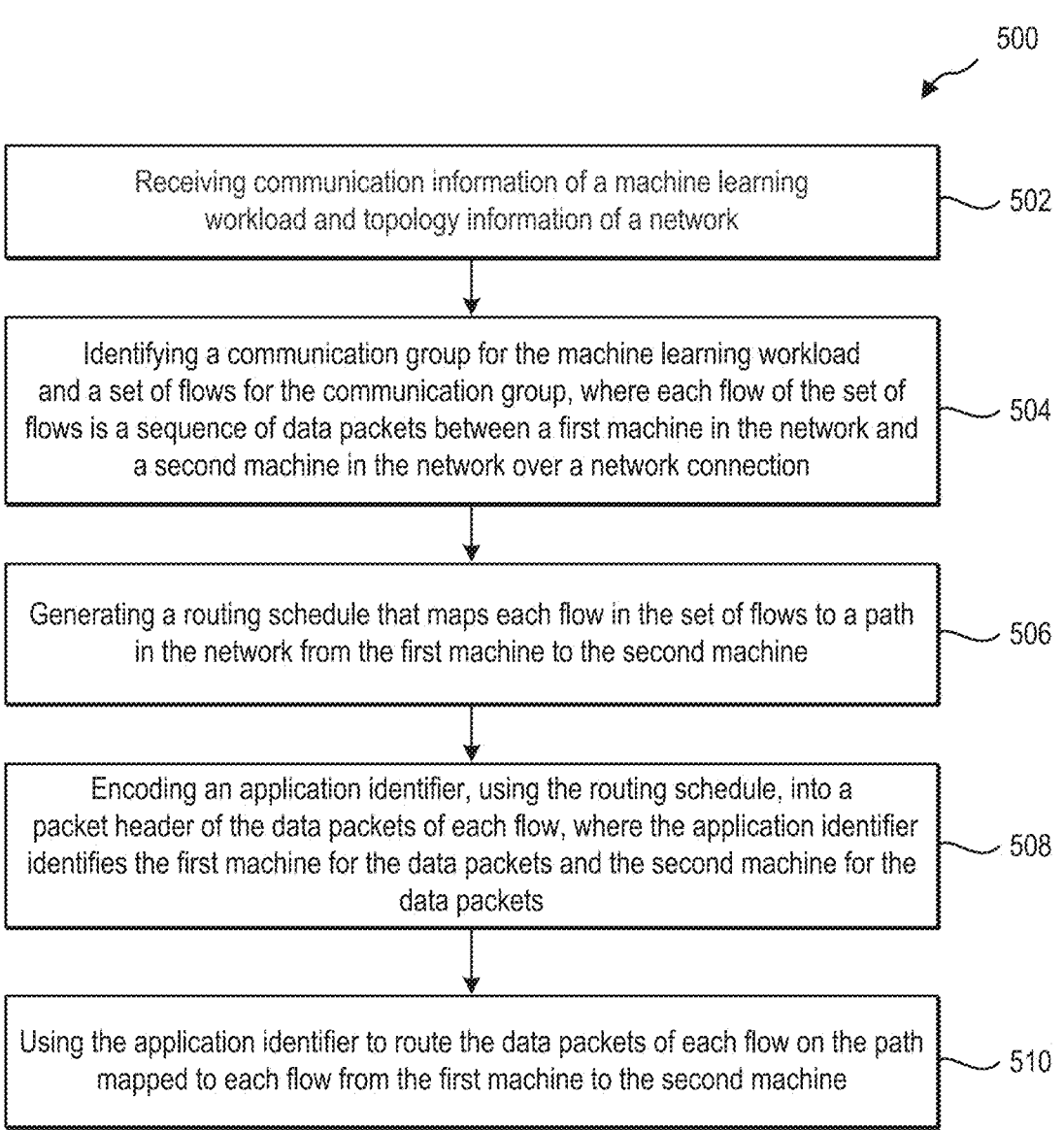

500

Receiving communication information of a machine learning
workload and topology information of a network          502

Identifying a communication group for the machine learning workload
and a set of flows for the communication group, where each flow of the set of
flows is a sequence of data packets between a first machine in the network and
a second machine in the network over a network connection          504

Generating a routing schedule that maps each flow in the set of flows to a path
in the network from the first machine to the second machine          506

Encoding an application identifier, using the routing schedule, into a
packet header of the data packets of each flow, where the application identifier
identifies the first machine for the data packets and the second machine for the
data packets          508

Using the application identifier to route the data packets of each flow on the path
mapped to each flow from the first machine to the second machine          510

FIG. 5

FLOW SCHEDULING FOR MACHINE LEARNING WORKLOADS

BACKGROUND

A significant increase in the scale and duration of machine learning training workloads has occurred, especially with the growing popularity of Large Language Models (LLMs). Machine learning training workloads require strong networking support to manage the collective communication used in distributed training across hundreds or even thousands of graphics processing units (GPUs). Numerous load balancing solutions are available for data center networks. Majority of the load balancing solutions are distributed, where hosts and switches make independent decisions to address the traditionally bursty and unpredictable traffic.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some implementations relate to a method. The method includes receiving communication information of a machine learning workload and topology information of a network. The method includes identifying a communication group for the machine learning workload and a set of flows for the communication group, wherein each flow of the set of flows is a sequence of data packets transferred between a first machine in the network and a second machine in the network over a network connection. The method includes generating a routing schedule that maps each flow in the set of flows to a path in the network from the first machine in the network to the second machine in the network. The method includes encoding an application identifier, using the routing schedule, into a packet header of the data packets of each flow, wherein the application identifier identifies the first machine for the data packets and the second machine for the data packets. The method includes using the application identifier to route the data packets of each flow on the path mapped to each flow from the first machine to the second machine.

Some implementations relate to a device. The device includes a processor; memory in electronic communication with the processor; and instructions stored in the memory, the instructions being executable by the processor to: receive communication information of a machine learning workload and topology information of a network; identify a communication group for the machine learning workload and a set of flows for the communication group, wherein each flow of the set of flows is a sequence of data packets transferred between a first graphics processing unit (GPU) in the network and a second GPU in the network over a network connection; generate a routing schedule that maps each flow in the set of flows to a path in the network from the first GPU in the network to the second GPU in the network; encode an application identifier, using the routing schedule, into a packet header of the data packets of each flow, wherein the application identifier identifies the first GPU for the data packets and the second GPU for the data packets; and use the application identifier to route the data packets of each flow on the path mapped to each flow from the first GPU to the second GPU.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 5 illustrates an example method for scheduling flows for machine learning workloads in accordance with implementations of the present disclosure.

DETAILED DESCRIPTION

Figure 1A:
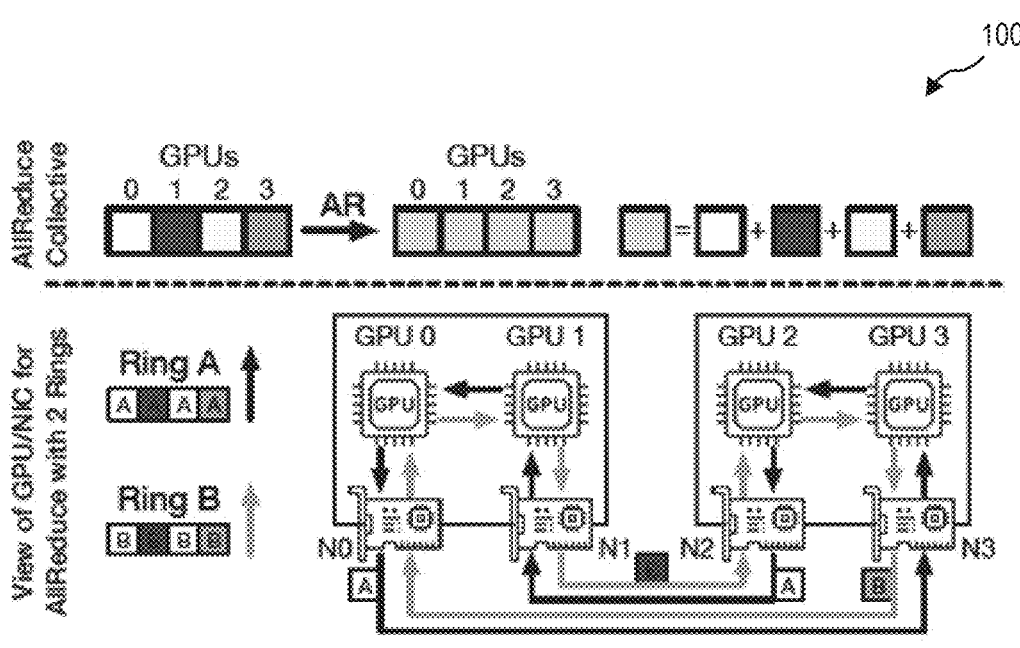
FIG. 1A illustrates an example of a ring configuration of a network.

This disclosure generally relates to load balancing in data center networks. A significant increase in the scale and duration of machine learning training workloads has occurred, especially with the growing popularity of Large Language Models (LLMs). Machine learning workloads (e.g., Llama and GPT) are typically trained using thousands or even tens of thousands of graphics processing units (GPUs). For example, it may take over one month to train a 175B parameters GPT-3 model on a cluster of 1024 A100 GPUs and may take 5 months to train a 65B parameters Llama 2 model with a cluster of 2048 A100 GPUs. A demand for even larger clusters of GPUs is expected for training LLMs, such as GPT-4. For example, training a GPT-4 model may require a cluster of GPUs of up to 16,000 GPUs.

In distributed ML training, intermediate states (e.g., parameters, activations) are synchronized through collective communication and the collective communication time increases as the system scales. A collective operation cannot finish until every individual network flow finishes. Straggler flows can thus block the completion on the collective operation and subsequent GPU operations. Network load balancing plays a critical role to make sure that every flow in the collective operation finishes fast. Equal-Cost Multi-Path (ECMP) is the most widely used load balancing approach in data centers today. ECMP assigns flows randomly to paths, causing network imbalances and increased completion times when multiple flows collide on paths.

Current solutions for improving load balancing in data center networks include centralized scheduling, host-based solutions, and switch-based solutions. Centralized scheduling solutions are often considered too slow for handling traffic in data centers, which is bursty and unpredictable. Host-based solutions rely on network congestion signals to adjust paths, which typically necessitates modifications to the network stack. This is a challenge for machine learning workloads that heavily depend on hardware-offloaded network stacks, as making such changes requires significant hardware modifications and may not align with evolving demands of machine learning networks. Switch-based solutions often employ proprietary protocols in ASICs for efficient load balancing but come with trade-offs like increased chip area, lower port density, higher power usage, vendor lock-in, and management complexities.

The methods and systems of the present disclosure leverages prior global knowledge of communication patterns of machine learning workloads by feeding the communication patterns into a centralized controller to guide per-flow routing decisions for machine learning workflows scheduling the flows across all available network paths to fully utilize network bandwidth capacity. The present disclosure includes a number of practical applications that provide benefits and/or solve problems associated with load balancing in data center networks. Examples of these applications and benefits are discussed in further detail below.

Machine learning workloads include regular communication patterns that are predictable and may be determined ahead of time leveraging prior knowledge of machine learning workloads. One example machine learning workload is a machine learning training workload. A machine learning training workload involves repetitive computation and communication patterns over long periods (i.e., days and months). Another example machine learning workload is a machine learning inference workload. A machine learning workload includes multiple iterations to perform the machine learning workload. Each iteration includes a plurality of flows. The flow is a sequence of data packets transferred between two GPUs over a network connection within a specified period of time. A single GPU may include multiple flows (e.g., multiple network connections to other GPUs). When each flow is completed for an iteration, the machine learning workload moves onto a next iteration in the machine learning workload.

In distributed machine learning for training and inference, collective communication operations are essential for computing and synchronizing activations and gradients across networked nodes. The collective communication primitives enable nodes to collaborate on shared data. For instance, AllReduce is a collective operation that aggregates data from multiple processing units (e.g., GPUs), applies a chosen operator (e.g., sum), and then distributes the result back to ensure every node possesses the same global outcome. Different collective algorithms can be employed to implement these collective primitives. For example, Collective Communication Libraries (CCLs), including NCCL (NVIDIA CCL) and RCCL (ROCm CCL), provide implementations for AllReduce using both ring-based and tree-based algorithms. In Ring AllReduce, all participating GPUs form a ring structure. At each step, the i-th (where i is a positive integer) GPU in the ring receives a data chunk from GPU (i−1) and forwards a chunk to GPU (i+1).

FIG. 1A illustrates an example of a Ring AllReduce configuration 100 involving four GPUs distributed across two hosts, each equipped with two network interface cards (NICs). To fully utilize the bandwidth, CCLs typically create multiple rings, each connecting all GPUs with different orderings. In this particular example, two rings are used (as shown by the arrows), with Ring A as the reverse of Ring B. Each NIC sends data for one ring while receiving data for the other ring, ensuring full utilization of bandwidth.

Collective communication groups and patterns, such as Ring AllReduce, Tree AllReduce, and AllToAll, rarely change during runtime of a machine learning workload. Data transfers occur over persistent network connections rather than the frequent creation and termination of flows, and flow sizes can be determined beforehand for the machine learning workloads.

Most machine learning clusters have dedicated backend high-speed networks exclusively for machine learning workload traffic, free from external interference by other applications. For example, a machine learning cluster interconnects tens of thousands of GPUs and exclusively carries machine learning traffic. The machine learning clusters typically adopt a network topology that consist of multiple tiers of switches, providing multiple equal-cost shortest paths for communications among GPUs located on different hosts in the machine learning clusters. One example machine learning cluster is an artificial intelligence (AI) cluster with dedicated backend networks with tens of thousands of GPUs exclusively for AI workload traffic (e.g., inference and training), free from external use by other applications. For example, AI backend networks commonly adopt Clos topologies. The Clos topologies consist of multiple tiers of switches, providing multiple equal-cost shortest paths for communication among GPUs located on different hosts.

Figure 1B:
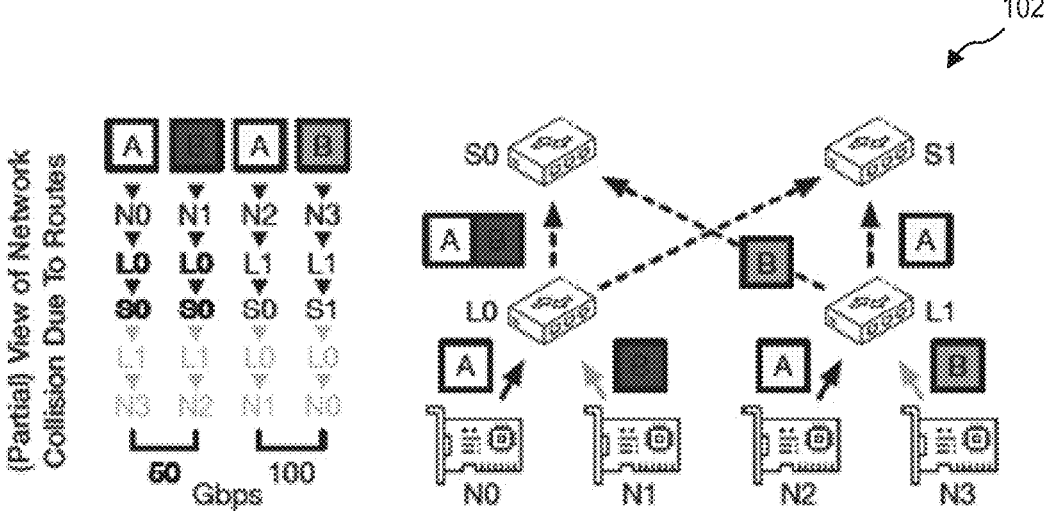
FIG. 1B illustrates an example of a two-tier network.

FIG. 1B illustrates a two-tier Clos network 102, specifically, a spine-leaf topology. Each leaf switch has four ports that connect to the two NICs of the host and two spine switches. There are two paths between NICs located under different leaf switches. For instance, for N0 to reach N3, one path traverses through S0, while the alternative path goes through S1. Distributing flows along multiple paths is a critical aspect of network management, commonly referred to as load balancing or route scheduling. The current practice is Equal-Cost Multi-Path (ECMP), which randomly hashes flows to paths. While ECMP ensures in-order delivery for each flow, hash collisions can lead to imbalances, impacting network performance. In FIG. 1B, there are four flows representing interhost communication of two rings, which we label based on the GPU/NIC and ring. Since flows 0A and 1B share paths through switch S0, they collide on link S0-L0, resulting in a reduced rate of 50 Gbps. In contrast, flows 2A and 3B are assigned non-overlapping paths, allowing them to achieve the full 100 Gbps rate.

Compared to traditional data center workloads, machine learning workloads are more sensitive to network imbalances. Collective primitives in machine learning workloads often involve many flows between GPUs. The completion of a collective primitive requires the completions of all the individual flows. Any staggering or delay in one of these flows can significantly stall the entire collective operation of the machine learning workload.

Machine learning workloads have regular traffic patterns, which can be known in advance and even persist for days and weeks. The methods and systems of the present disclosure use prior global knowledge of the traffic patterns for machine learning workloads and the network topology to schedule the machine learning workloads. A workload analyzer analyzes the machine learning workload's parallelization strategies and communication patterns and provides information about the machine learning workload to a centralized controller.

The centralized controller computes an optimized flow schedule for the different iterations of the machine learning workload. The centralized controller uses the prior global knowledge of the machine learning workloads to compute an ideal path for each flow and ensures that flows are pinned to a respective path within the network, allowing the centralized controller to proactively avoid network imbalances and congestion. In some implementations, the centralized controller uses a round-robin algorithm for scheduling the different flows of the machine learning workload across the paths of the network to balance a load of the network. In some implementations, the centralized controller uses a best-fit algorithm for scheduling the different flows of the machine learning workload across the paths of the network to balance a load of the network. During runtime, each switch in the network runs an agent that keeps monitoring network changes and notifies the centralized controller about the near real-time network topology. In some implementations, network failures are handled using a ECMP failover strategy. In some implementations, network failures are handled using a rebalance strategy.

The methods and systems proactively schedule flow routes for machine learning workloads while adapting to network changes (e.g., link failures) by using dynamic code analysis to understand the properties of the machine learning workload, while designing efficient algorithms for re (computing) schedules.

One technical advantage of the systems and methods of the present disclosure is improving communication performance of machine learning models. For example, the systems and methods of the present disclosure speed up communication in model training by 1.54× compared to ECMP. Another technical advantage of the systems and methods of the present disclosure is to optimize the network data transmissions. Another technical advantage of the systems and methods of the present disclosure is relying on policy-based routing to direct flows in the network without hardware changes. Another technical advantage of the systems and methods of the present disclosure is scalability of the flow scheduling to large-scale networks. For example, the systems and methods can scale to 16,000 GPUs for use with the machine learning workloads.

Figure 2:
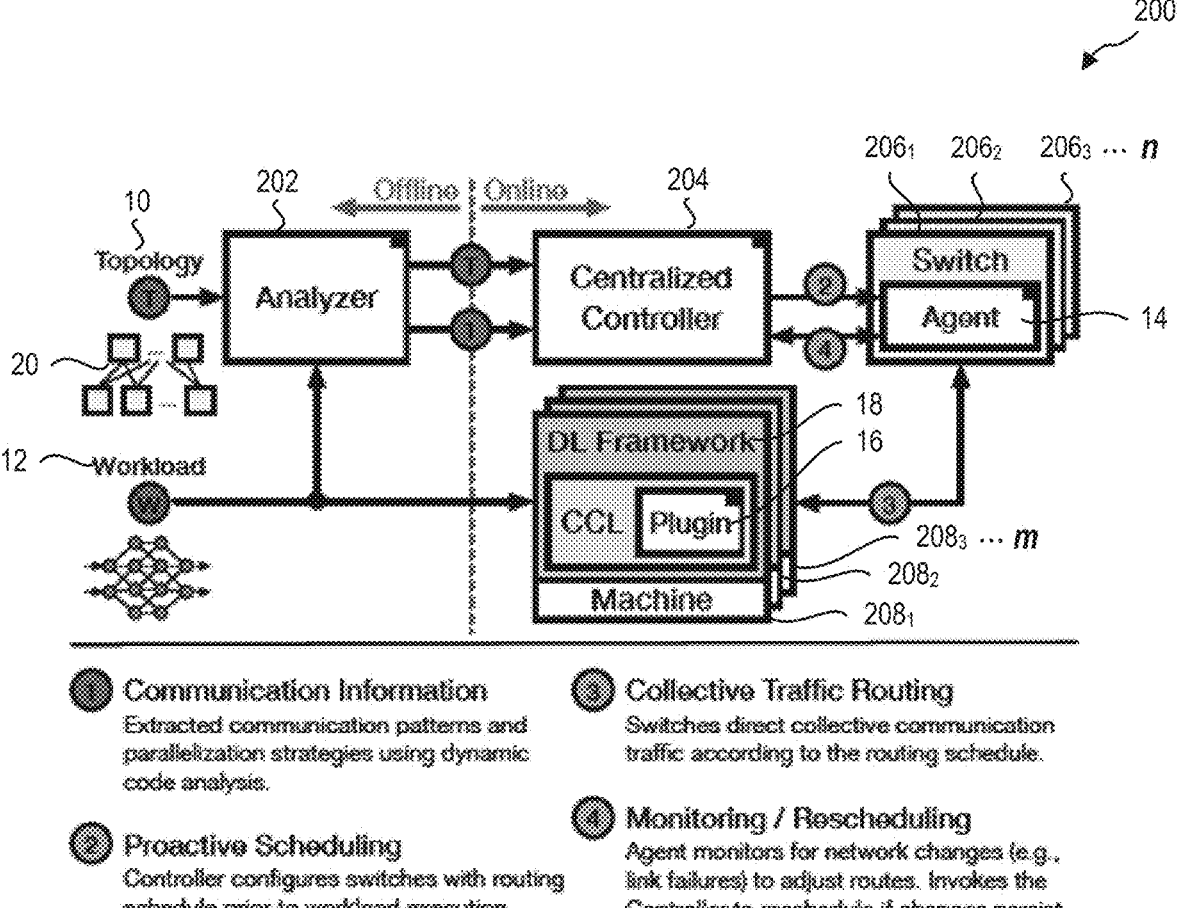
FIG. 2 illustrates an example environment for flow scheduling for machine learning workloads in accordance with implementations of the present disclosure.

Referring now to FIG. 2, illustrated is an example environment 200 for flow scheduling for machine learning workloads 12. The environment includes an offline portion and an online portion. The environment 200 includes an analyzer 202 in communication with a centralized controller 204. In an offline portion of the environment 200, the analyzer 202 receives a network topology 10 for a network 20 that carries the machine learning workloads 12. The network topology 10 describes the physical and logical structure of a network 20. The network topology 10 maps the way different nodes on the network 20 are placed and interconnected, as well as how data flows. Nodes on a network include devices, such as, switches $206_1$, $206_2$, $206_3$ (up to n switches (where n is a positive integer)) and routers, and software with switch and router features.

The analyzer 202 receives the machine learning workload 12 as input and analyzes the parallelization strategies and communication patterns of the machine learning workload 12. The communication pattern of a collective depends on the algorithm being used (e.g., ring or tree) and topology, where the CCL compute a data transfer schedule during initialization. Examples of CCLs include NCCL (NVIDIA CCL) and RCCL (ROCm CCL). The analyzer 202 extracts the sender-receiver GPU pairs that cross the network 20, with each pair corresponding to a flow in the network 20 (using sender and receiver NICs). CCLs utilize multiple concurrent communication channels to parallelize collective operations by fully utilizing all available GPU compute resources (e.g., the machines $208_1$ $208_2$, $208_3$) and interconnects in the network 20. Data buffers are divided into equal sized chunks, and each channel is assigned one chunk. Each channel can employ different rings or trees with different NICs.

The analyzer 202 identifies the communication groups and the communication patterns of the machine learning workload 12. Example communication groups include All-Reduce operation, AllGather operation, Broadcast operation, Reduce operation, and ReduceScatter operation. The AllReduce operation is performing reductions on data (for example, sum, min, max) across devices and writing the result in the receive buffers of every rank. The Broadcast operation copies an N-element buffer on the root rank to all ranks. The Reduce operation is performing the same operation as AllReduce but writes the result only in the receive buffers of a specified root rank. The AllGather operation gathers N values from k ranks into an output of size k*N, and distributes that result to all ranks. The ReduceScatter operation performs the same operation as the Reduce operation, except the result is scattered in equal blocks between ranks, each rank getting a chunk of data based on its rank index.

In some implementations, the analyzer 202 wraps the application programming interfaces (APIs) of distributed training and inference modules in DL frameworks 18 (e.g., torch.distributed) to extract the communication pattern of the machine learning workload 12. A GPU may participate in multiple collective communication groups. Each communication group performs collectives on a subset of the participating GPUs, depending on the parallel paradigm. For pure data parallelism, there is only a single communication group containing all GPUs. For hybrid training using a mixture of data, tensor or pipeline parallelism, there are multiple communication groups. For example, if 8 GPUs are used for training, where the model is partitioned into 2 chunks with tensor parallelism, then there are 2 data parallel groups to reduce gradients, each of them consists of 4 GPUs with the same model partition. For each communication group, the analyzer 202 extracts the set of flows (connections) for inter-host communication established by the CCL.

The output of the analyzer 202 is each communication group and the set of the flows for each communication group extracted by the analyzer 202 in response to the analysis of the machine learning workload 12. At 1, the output of the analyzer 202 and the network topology 10 is provided to the centralized controller 204. The centralized controller 204 uses the prior global knowledge of the machine learning workloads 12 (e.g., the communication information of the machine learning workload 12 provided by the analyzer 202) to compute an ideal path for each flow in the set of flows and ensures that flows are pinned to a respective path within the network 20. The centralized controller 204 computes a routing schedule for the flows that the machine learning workload 12 will generate.

For each communication group the analyzer 202 extracted, the centralized controller 204 generates a flow routing schedule that maps each flow to a route in the network 20, given the set of flows in the communication group. In many collective algorithms, such as, ring and tree used by CCLs, flows within a communication group often have similar sizes and typically start around the same time. When hybrid parallel strategies are used, flow collisions from different communicator groups have to be avoided. Communication groups of different parallelism generally do not lead to flow collision. For example, communication for pipeline parallelism happens during each forward/backward pass, while the AllReduce associated with data parallelism takes place after the backward pass (or even after a few gradient accumulation steps). In some implementations, multiple groups utilize the network at the same time, e.g., gradient AllReduce from different data parallelism groups, and the centralized controller 204 jointly optimizes the schedule of the flows from groups corresponding to the same parallelism.

In some implementations, the centralized controller 204 uses a round-robin algorithm to assign flows of a communication group to paths of the network 20 to balance a load of the network 20. Algorithm 1 illustrates an example round-robin algorithm used by the centralized controller 204 to assign flows to paths.

| Algorithm 1: Round-Robin | |
|---|---|
| | Input : A flow f ∈ F, current path index c |
| | Output : Route assignment for f. |
| 1 | Function RoundRobin(f, c) |
| 2 | | path ← c |
| 3 | | c ← (c + 1) mod numSpineSw |
| 4 | | return path |

Using Algorithm 1, the centralized controller 204 sorts the flows (F) according to the receiver NIC's index, and assigns the flows one by one in a round-robin fashion. In this manner, different paths are assigned to flows targeted by the same receiving leaf switch. For example, in a Clos network topology, the path between a pair of NICs is uniquely determined by an uppermost switch (e.g., spine switches in spine-leaf and core switches in the 3-tier fat-tree) and Algorithm 1 round-robins only on the uppermost switch a flow goes through. For example, in the spine-leaf network topology, Algorithm 1 returns a mapping that maps each flow to its assigned spine switch.

In some implementations, the centralized controller 204 uses a best fit algorithm to assign flows of a communication group to paths of the network 20 to balance a load of the network 20. Algorithm 2 illustrates an example best fit algorithm used by the centralized controller 204 to assign flows to paths.

| Algorithm 2: Best Fit | |
|---|---|
| | Input : A flow f ∈ F, link usages u |
| | Output : Route assignment for f |
| 1 | Function BestFit(f, u) |
| 2 | | minOverload ← ∞ |
| 3 | | for c ∈ 0..numSpineSw do |
| 4 | | | ol ← 0 |
| 5 | | | for e ∈ GetPath(f, c) do |
| 6 | | | | ol ← ol + max($u_e$ + $d_f$ − $c_e$, 0) |
| 7 | | | | if ol < minOverload then |
| 8 | | | | | minOverload ← ol |

-continued

| Algorithm 2: Best Fit | |
|---|---|
| 9 | | | | | bestPath ← c |
| 10 | | for e ∈ GetPath(f, bestPath) do |
| 11 | | | $u_e$ ← $u_e$ + $d_f$ |
| 12 | | return bestPath |

Using Algorithm 2, the centralized controller 204 uses heuristics that greedily assigns the best path for each flow, where the total overload of the links among the path is minimized. To compute the link overload, the centralized controller 204 first computes the natural demand ($d_f$) of each flow (f), which is the rate f gets in a fully nonblocking topology, as if all NICs are connected to a single switch. In some implementations, the centralized controller 204 uses a standard min-max fair share rate allocation for computing flow demand using an iterative algorithm. Overload on a link e is given by max $(0, c_e - \Sigma_{f \in F_e} d_f)$, where $F_e$ is the set of flows that go through e and $c_e$ is the link capacity. GetPath (f, c) returns the path through c-th spine switch for f, $u_e$ is the usage of link e.

In some implementations, multiple jobs share a cluster (e.g., a set of machines 208₁ 208₂, 208₃). The centralized controller 204 achieves flexible network resource allocation across multiple jobs, effectively reducing contention in the network 20. When a new job arrives, the centralized controller 204 initially reserves specific network links exclusively for that job, thereby creating an independent network dedicated to that particular job. The network resource allocation strategy used by the centralized controller 204 is flexible and may consider factors, such as, the job's GPU count or priority. The centralized controller 204 takes both the job's communication pattern and the topology of its dedicated network into consideration to compute the scheduling for the job. By reserving specific network links exclusively for a job, the centralized controller 204 prevents traffic from multiple scheduled jobs from sharing a network link, thereby ensuring strong isolation and maintaining predictable network performance. In contrast, most existing load balancing solutions do not differentiate between applications and jobs, making it challenging to achieve strong performance isolation for multiple jobs.

At 2, the centralized controller 204 uses the routing schedule to preconfigure the network switches 206₁, 206₂, 206₃ accordingly prior to starting the machine learning workload 12 (e.g., the workload execution). In CCLs, a flow is uniquely identified by the five-tuple (COMMUNICATOR ID, SOURCE GPU, DESTINATION GPU, CHANNEL ID, CONNECTION ID). The centralized controller 204 generates the flow schedule and maps the application five-tuple key to a network path, which is a list of switches (e.g., 206₁→206₂→206₃). The switch (e.g., the switch 206₁) determines the next hop (e.g., the switch 206₂) for a packet, the switch can only inspect packet fields, e.g., IP addresses, lacking insight into application semantics of the packet.

At 3, the switches 206₁, 206₂, 206₃ direct collective communication traffic for the flows of the machine learning workload 12 according to the routing schedule to different machines 208₁, 208₂, 208₃ (e.g., different GPUs in the network). The network 20 may include any number of machines up to m, where m is a positive integer. Each machine 208₁ 208₂, 208₃ includes a collective communication library (CCL) plugin 16 that is integrated with the CCL used by the deep learning (DL) framework 18 on the machine 208₁ 208₂, 208₃. The DL framework 18 offers building blocks for designing, training, and validating deep neural networks. The CCL provides a programming interface for frequently used operations in the DL framework 18. Example operations include multi-GPU and multi-node communication primitives, such as, reduce, gather, broadcast, scatter, concatenates, synchronize, and shift.

The CCL plugin 16 embeds a unique identifier to data packets of each flow, allowing the switches $206_1$, $206_2$, $206_3$ to identify the flows and forward the flows across paths in the network to the different machines $208_1$ $208_2$, $208_3$ computed by the centralized controller 204. The CCL plugin 16 is used to encode the application semantics into packet headers of each flow. When the DL frameworks 18 call CCL APIs to establish connections, the CCL plugin 16 calculates a unique integer, known as the application identifier, for each connection (queue pair, QP). In some implementations, the connection is a RDMA connection. The application identifier is derived by applying a one-to-one function to the application five-tuple associated with the queue pair: (COMMUNICATOR ID, SOURCE GPU, DESTINATION GPU, CHANNEL ID, CONNECTION ID). The application identifier is then embedded in the header of all data packets associated with the queue pair.

In some implementations, low-level RDMA APIs, such as MLX5DV MODIFY QP UDP SPORT for NVIDIA NICs, write the application identifier into the UDP source port field of RDMA over Converged Ethernet (RoCE) v2 packets1. Within the RoCEv2 specification, the UDP source port is typically randomly generated to introduce entropy for multipath load balancing. The switches, $206_1$, $206_2$, $206_3$ repurpose this field to shift routing decisions from randomized to deterministic.

The switches $206_1$, $206_2$, $206_3$ leverage policy-based routing (PBR) to route data packets based on the UDP source port, instead of the destination IP address. Each switch $206_1$, $206_2$, $206_3$ runs a switch agent 14. Upon receiving the routing schedule from the centralized controller 204, the switch agent 14 computes the per-queue pair application identifier, akin to the CCL plugin 16. Subsequently, it generates PBR configurations to route data packets with specific UDP ports to designated neighboring switches, ensuring that data packets associated with a particular queue pair exclusively follow a predefined path across the network. The switch PBR configurations are installed prior to running a machine learning workload 12 and remain unchanged throughout the execution of the machine learning workload 12 unless serious network changes necessitate rescheduling.

At 4, a switch agent 14 on each of the switches $206_1$, $206_2$, $206_3$, monitors the network 20 for changes to adjust routes, if necessary. Examples of network changes include link failures or switch reboots. To detect such changes, the switch agent 14 periodically checks the reachability of next hop destinations as defined in routing policies by inspecting the forwarding table. If a next hop is found to be unreachable, the switch agent 14 takes immediate action by removing all associated policies linked to that next hop and uses ECMP failover to handle the flow. This approach prevents routing black holes and minimizes disruption to ongoing machine learning workloads 12 under link failures.

In some implementations, when handling traffic from multiple jobs, Virtual Routing and Forwarding (VRF) is used to create multiple routing tables on each switch $206_1$, $206_2$, $206_3$, one for each job. Links reserved for various jobs are associated with separate routing tables on the switch $206_1$, $206_2$, $206_3$, enforcing strict isolation to prevent any packet leakage between these tables. In the event of a link failure reserved for a specific job, traffic is rerouted by the switch $206_1$, $206_2$, $206_3$ only to links allocated for that particular job, thus preserving isolation.

The switch agent 14 notifies the centralized controller 204 of the real-time network topology of the network 20 so that the centralized controller 204 may reschedule the routing schedule if the network change persists. While the switch agent 14 may address short-term network failures, such as transient link down events, using ECMP failover or VRF, the switch agent 14 initiates scheduling precomputation if network changes persist (e.g., a problematic switch is isolated from production for debugging).

When the switch agent 14 detects persistent network changes in the network 20, such as an inter-switch link being in a down state for an extended duration, the switch agent 14 reports this change to the centralized controller 204. The centralized controller 204, in turn, collects network change information from all switches $206_1$, $206_2$, $206_3$, recomputes the scheduling for the flows assigned to the failed links, and distributes the updated routing schedule to the switches $206_1$, $206_2$, $206_3$. Subsequently, the switches $206_1$, $206_2$, $206_3$ generate and apply new PBR configurations to enforce the modified scheduling. The recomputing of the scheduling for the flows only entails switch reconfigurations without touching the CCL plugin 16 at the host. In some implementations, where a NIC, GPU, or a NIC-to-switch link experiences a failure, resulting in some GPUs becoming unavailable, it is not feasible to continue training using the existing communication patterns. Instead, the centralized controller 204 is required to initiate a new job and compute a fresh schedule from the beginning.

In some implementations, one or more computing devices (e.g., servers and/or devices) are used to perform the processing of the environments 200. The one or more computing devices may include, but are not limited to, server devices, cloud virtual machines, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the centralized controller 204 and the analyzer 202 are implemented wholly on a computing device. Another example includes one or more subcomponents of the centralized controller 204 and/or the analyzer 202 implemented across multiple computing devices. Moreover, in some implementations, one or more subcomponent of the centralized controller 204 and/or the analyzer 202 may be implemented are processed on different server devices of the same or different cloud computing networks.

In some implementations, each of the components of the environment 200 is in communication with each other using any suitable communication technologies. In addition, while the components of the environment 200 are shown to be separate, any of the components or subcomponents may be combined into fewer components, such as into a single component, or divided into more components as may serve a particular implementation. In some implementations, the components of the environment 200 include hardware, software, or both. For example, the components of the environment 200 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 200 include hardware, such as a special purpose processing device to perform a certain function or group of functions. In some implementations, the components of the environment 200 include a combination of computer-executable instructions and hardware.

Figure 3:
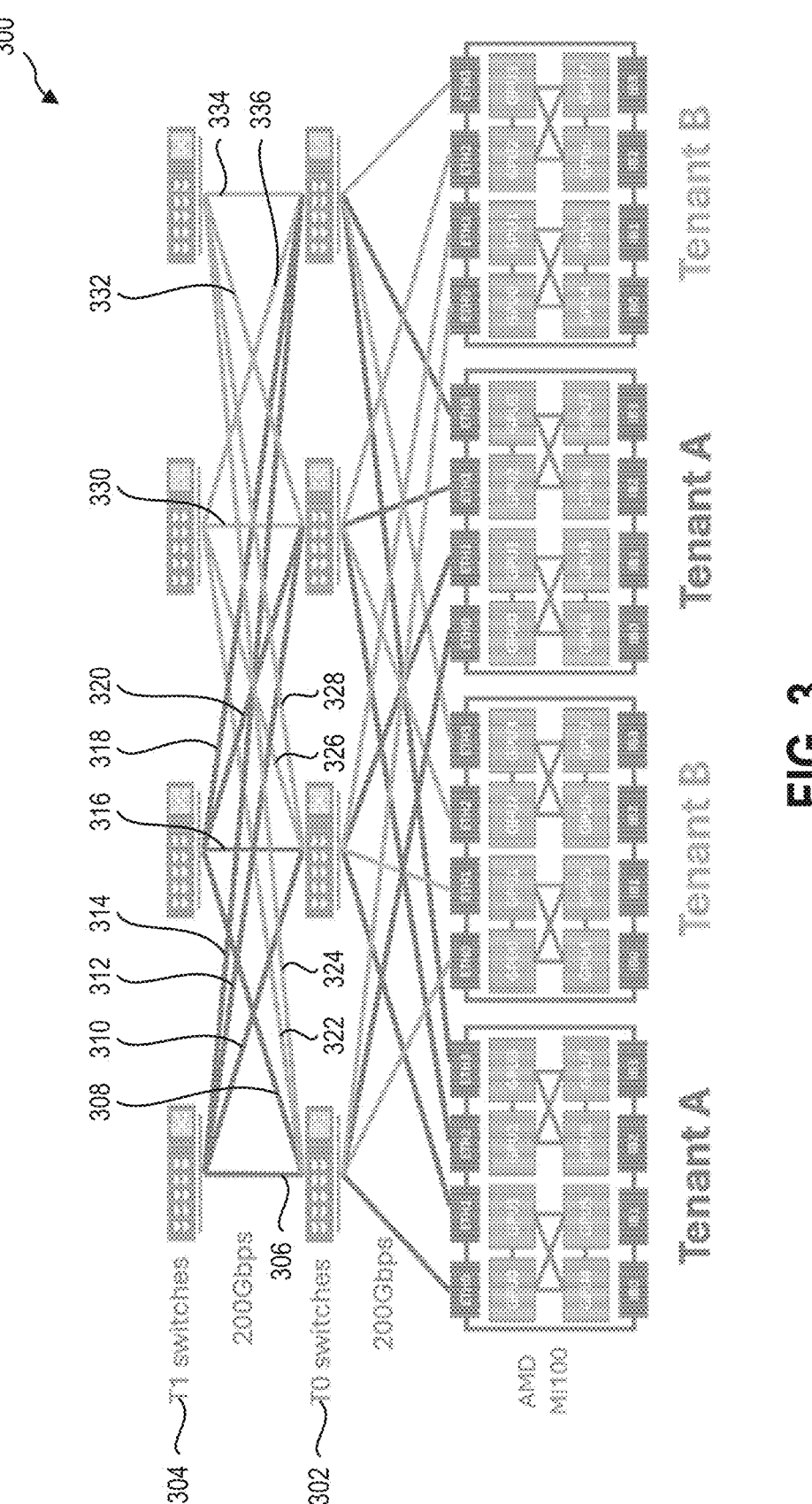
FIG. 3 illustrates an example of enabling dedicated links in a network for different jobs in accordance with implementations of the present disclosure.

FIG. 3 illustrates an example of enabling dedicated links in a network 300 for the machine learning workloads (e.g., the machine learning workload 12 (FIG. 2)). The network 300 includes a plurality of GPUs (e.g., the machines 208₁ 208₂, 208₃ (FIG. 2)) in communication with a plurality of switches (e.g., the switches 206₁, 206₂, 206₃ (FIG. 2)). The switches have two layers, a TO switch layer 302 and a Tl switch layer 304. Each tenant (Tenant A and Tenant B) in the network 300 has a GPU server with network paths that connect the GPUs of the server networks for each tenant to a switch at the TO switch layer 302. Between the TO switch layer 302 and the Tl switch layer 304, the sixteen network paths 306, 308, 310, 312, 314, 316, 318, 320, 322, 324, 326, 328, 330, 332, 334, 336 may be shared between tenants (Tenant A and Tenant B) on the network 300.

In some implementations, the centralized controller 204 (FIG. 1) allocates a subset of the network paths to each of the tenants restricting the network traffic from each tenant to the subset of network paths allocated to each tenant. By reserving a portion of the network links exclusively for the machine learning workloads 12 of a tenant on the network 300, the centralized controller 204 creates an independent network for each tenant dedicated to the particular the machine learning workloads 12 of each tenant.

For example, the centralized controller 204 allocates eight of the sixteen network paths (e.g., the network paths 306, 308, 310, 312, 314, 316, 318, 320) to Tenant A. The centralized controller 204 schedules the data packets for the flows of the machine learning workloads for Tenant A using the network paths 306, 308, 310, 312, 314, 316, 318, 320. The centralized controller 204 allocates the remaining eight network paths (e.g., the network paths 322, 324, 326, 328, 330, 332, 334, 336) to Tenant B. The centralized controller 204 schedules the data packets for the flows of the machine learning workloads for Tenant B using the network paths 322, 324, 326, 328, 330, 332, 334, 336. By reserving a portion of the network links exclusively for the machine learning workloads 12 of a tenant on the network 300, the centralized controller 204 prevents traffic from multiple scheduled machine learning workloads 12 of different tenants from sharing a network link, thereby ensuring strong isolation and maintaining predictable network performance.

Figure 4:
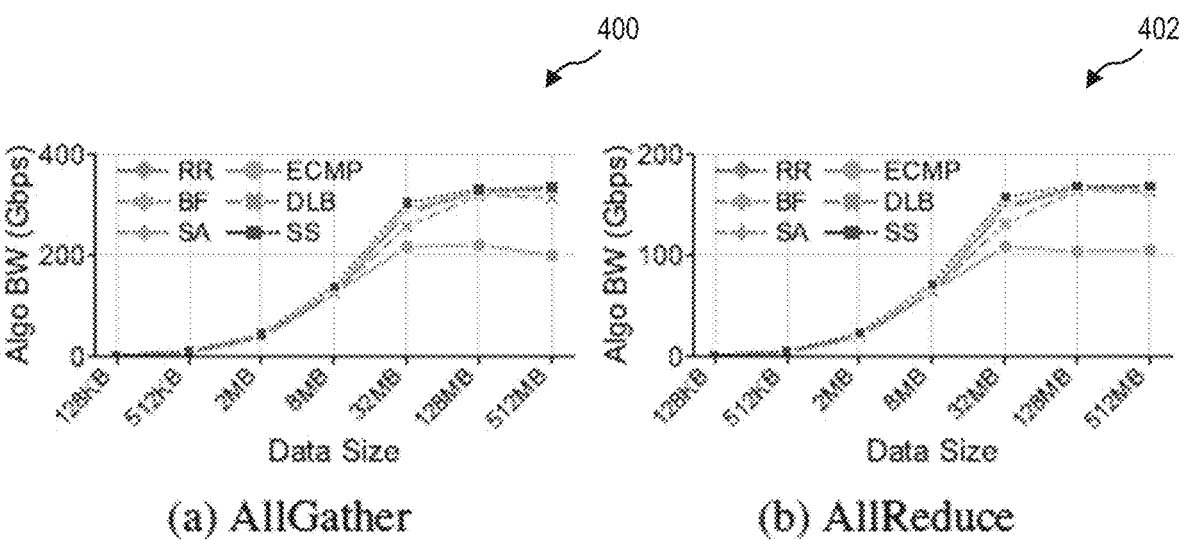
FIG. 4 illustrates example graphs illustrating bandwidth results for different algorithms using different scheduling implementations of the present disclosure.

FIG. 4 illustrates example graphs 400, 402 illustrating bandwidth results of different algorithms, AllGather and AllReduce using different scheduling implementations of the centralized controller 204 (FIG. 2). The AllGather algorithm gathers N values from k ranks into an output of size k*N, and distributes that result to all ranks. The output is ordered by rank index. The AllGather operation is therefore impacted by a different rank or device mapping. The AllReduce algorithm is performing reductions on data (for example, sum, min, max) across devices and writing the result in the receive buffers of every rank. In an AllReduce operation between k ranks and performing a sum, each rank will provide an array Vk of N values, and receive an identical arrays S of N values, where $S[i]=V0[i]+V1[i]+ \ldots +Vk-1[i]$.

The graph 400 illustrates bandwidth results for the AllGather algorithm and the graph 402 illustrates the bandwidth results for the AllReduce algorithm. The graphs 400, 402 present the algorithm bandwidth results of different schemes for AllGather and AllReduce with different data size (measured by output buffer). Each result is an average of ten rounds of experiments. For small data sizes, ECMP, DLB and scheduling provided by the centralized controller 204 demonstrate similar performance, as latency cost dominates. SS exhibits approximately 10% better performance, benefiting from the lower per-hop forwarding latency of IB compared to Ethernet, especially considering our Ethernet topology involves more hops. As data size grows larger, ECMP experiences a significant performance penalty. When data sizes ranges from 32 MB to 512 MB, RR, BF and SA (different implementations of scheduling provided by the centralized controller 204) are 35% to 61% faster than ECMP on AllReduce and on 31% to 66% on AllGather. For instance, the scheduling algorithms of the centralized controller 204 beat DLB by 12% on 32 MB AllReduce, drops to 2% on 128 MB, and increases to 5% on 512 MB.

FIG. 5 illustrates an example method 500 for scheduling flows for machine learning workloads 12 (FIG. 2). The actions of the method 500 are discussed below in reference to FIGS. 2 and 3.

At 502, the method 500 includes receiving communication information of a machine learning workload and topology information of a network. The centralized controller 204 receives communication information of a machine learning workload 12 from an analyzer 202. The communication information identifies one or more communication groups for the machine learning workload 12. In some implementations, the communication information includes communication patterns and parallelization strategies of the machine learning workload.

In some implementations, the analyzer 202 identifies the communication information (the communication groups and the communication patterns) offline prior to execution of the machine learning workload 12. Example communication groups include AllReduce operation, AllGather operation, Broadcast operation, Reduce operation, and ReduceScatter operation. In some implementations, the analyzer 202 extracts the communication information using dynamic code analysis of the machine learning workload 12. For example, the analyzer 202 wraps the APIs of distributed training and inference modules in DL frameworks 18 to extract the communication pattern of the machine learning workload. The analyzer 202 uses the communication information (the communication patterns and the parallelization strategies) to identify the set of flows for the machine learning workload 12.

The output of the analyzer 202 is the communication information with each communication group and the set of the flows for each communication group extracted by the analyzer 202 in response to the analysis of the machine learning workload 12. The analyzer 202 provides the communication information (e.g., the communication groups and the communication patterns) of the machine learning workload 12 and the network topology 10 information of the network 20 to the centralized controller 204. The network topology 10 maps the way different nodes on the network 20 are placed and interconnected, as well as how data flows.

At 504, the method 500 includes identifying a communication group for the machine learning workload and a set of flows for the communication group, where each flow of the set of flows is a sequence of data packets transferred between a first machine in the network and a second machine in the network over a network connection. The centralized controller 204 uses the output of the analyzer 202 to identify a communication group for the machine learning workload 12 and a set of flows for the communication group. Each flow of the set of flows is a sequence of data packets transferred between a first machine (e.g., the machine $208_1$) in the network 20 and a second machine (e.g., the machine $208_2$) in the network 20 over a network connection within a specified period of time.

At 506, the method 500 includes generating a routing schedule that maps each flow in the set of flows to a path in the network from the first machine in the network to the second machine in the network. The network 20 includes a plurality of paths between different sources (e.g., the first machine) and different destinations (e.g., the second machine). The path includes one or more switches (e.g., the switches $206_1$, $206_2$, $206_3$) in the network 20 that establish the network connection between the first machine (e.g., the machine $208_1$) and the second machine (e.g., the machine $208_2$). One example of the path includes the switch $206_1$ and the switch $206_2$ between the first machine (e.g., the machine $208_1$) and the second machine (e.g., the machine $208_2$). Another example of the path includes the switch $206_1$ and the switch $206_3$ between the first machine (e.g., the machine $208_1$) and the second machine (e.g., the machine $208_2$). In some implementations, the first machine is a graphics processing unit (GPU) and a source of a flow, and the second machine is a GPU and a destination for the flow.

The centralized controller 204 uses the prior global knowledge of the machine learning workloads 12 (e.g., the communication information of the machine learning workload 12 provided by the analyzer 202) and the network topology 10 to compute an ideal path for each flow in the set of flows and ensures that flows are pinned to a respective path within the network 20. In many collective algorithms, such as, ring and tree used by CCLs, flows within a communication group often have similar sizes and typically start around the same time. In addition, collective communication groups and patterns, such as Ring AllReduce, Tree AllReduce, and AllToAll, rarely change during runtime of a machine learning workload.

The centralized controller 204 computes a routing schedule for the set of flows that the machine learning workload 12 will generate using the ideal paths determined for each flow in the set of flows. In some implementations, different flows of the set of flows are assigned to different paths in the network 20 to balance an amount of network traffic from the set of flows across the different paths. In some implementations, the centralized controller 204 uses a round-robin algorithm to generate the routing schedule. The round-robin algorithm assigns each flow of the set of flows to different paths in the network one by one to balance an amount of network traffic from the set of flows across the different paths in the network. In some implementations, the centralized controller 204 uses a best-fit algorithm to generate the routing schedule. The best-fit algorithm uses heuristics to assign a best path for each flow to balance an amount of network traffic from the set of flows across the different paths in the network. In some implementations, the centralized controller 204 assigns the set of flows to a subset of paths within the network that are reserved exclusively for executing the machine learning workload.

At 508, the method 500 includes encoding an application identifier, using the routing schedule, into a packet header of data packets of each flow, where the application identifier identifies the first machine for the data packets and the second machine for the data packets. The centralized controller 204 configures the switches (e.g., the switches $206_1$, $206_2$, $206_3$) in the network 20 with the routing schedule prior to execution of the machine learning workload 12. The routing schedule is used to encode an application identifier into a packet header of data packets of each flow. The application identifier identifies the first machine (e.g., the machine $208_1$) for the data packets of each flow and the second machine (e.g., the machine $208_2$) for the data packets of each flow. In some implementations, a CCL plugin 16 is used to generate the application identifier and embed the application identifier into the data packets associated with the first machine (e.g., the machine $208_1$) and the second machine (e.g., the machine $208_2$).

At 510, the method 500 includes using the application identifier to route data packets of each flow on the path mapped to each flow from the first machine to the second machine. The switches (e.g., the switches $206_1$, $206_2$, $206_3$) in the network 20 use the application identifier to route data packets of each flow on the path mapped to each flow from the first machine (e.g., the machine $208_1$) to the second machine (e.g., the machine $208_2$).

In some implementations, the switches (e.g., the switches $206_1$, $206_2$, $206_3$) in the network 20 monitor a status of the network 20 and use ECMP failover to redirect the set of flows for the machine learning workload in response to determining the status of the network 20 includes a temporary link failure on the paths in the network 20.

In some implementations, the switches (e.g., the switches $206_1$, $206_2$, $206_3$) in the network 20 monitor a status of the network 20 and send a notification to the centralized controller 204 of a persistent network change. The centralized controller 204 collects network change information from switches in the network in response to receiving the notification, generates an updated flow routing schedule using the network change information, and uses the updated flow routing schedule to route the data packets of each flow from the first machine (e.g., the machine $208_1$) to the second machine. The centralized controller 204 proactively schedules flow routes for machine learning workloads 12 while adapting to network changes (e.g., link failures) by using dynamic code analysis to understand the properties of the machine learning workload 12, while designing efficient algorithms for re (computing) schedules.

In some implementations, multiples jobs share a cluster (e.g., a set of machines $208_1$ $208_2$, $208_3$). The centralized controller 204 achieves flexible network resource allocation across multiple jobs, effectively reducing contention in the network 20. When a new job arrives, the centralized controller 204 initially reserves specific network links exclusively for that job, thereby creating an independent network dedicated to that particular job.

The network resource allocation strategy used by the centralized controller 204 is flexible and may consider factors, such as, the job's GPU count or priority. The centralized controller 204 takes both the job's communication pattern and the topology of its dedicated network into consideration to compute the scheduling for the job. By reserving specific network links exclusively for a job, the centralized controller 204 prevents traffic from multiple scheduled jobs from sharing a network link, thereby ensuring strong isolation and maintaining predictable network performance.

One example use case of multiple jobs includes the centralized controller 204 reserves a first subset of the paths within the network 20 for the set of flows for the machine learning workload and generates the flow routing schedule that maps each flow in the set of flows to the paths within the first subset of paths from the first machine (e.g., the machine $208_1$) to the second machine (e.g., the machine $208_2$) in the network 20. When a second machine learning workload for use on the network 20 arrives, the centralized controller 204 reserves a second subset of paths within the network 20 for the set of flows for the second machine learning workload and generates the flow routing schedule that maps each flow in the set of flows in the second machine learning workload to paths within the second subset of paths from the first machine (e.g., the machine 208₁) to the second machine (e.g., the machine 208₂) in the network 20. In some implementations, the switches (e.g., the switches 206₁, 206₂, 206₃) in the network 20 monitor a status of the network 20 and use a plurality of routing tables on each switch in the network to redirect the set of flows for the machine learning workload within the first subset of paths and the set of flows for the second machine learning workload within the second subset of paths in response to determining the status of the network 20 includes a temporary link failure on the paths in the network 20.

The method 500 uses the prior knowledge of machine learning workloads 12 to guide per-flow routing decisions for machine learning workflows to schedule the flows across all available network paths to fully utilize network bandwidth capacity.

Figure 6:
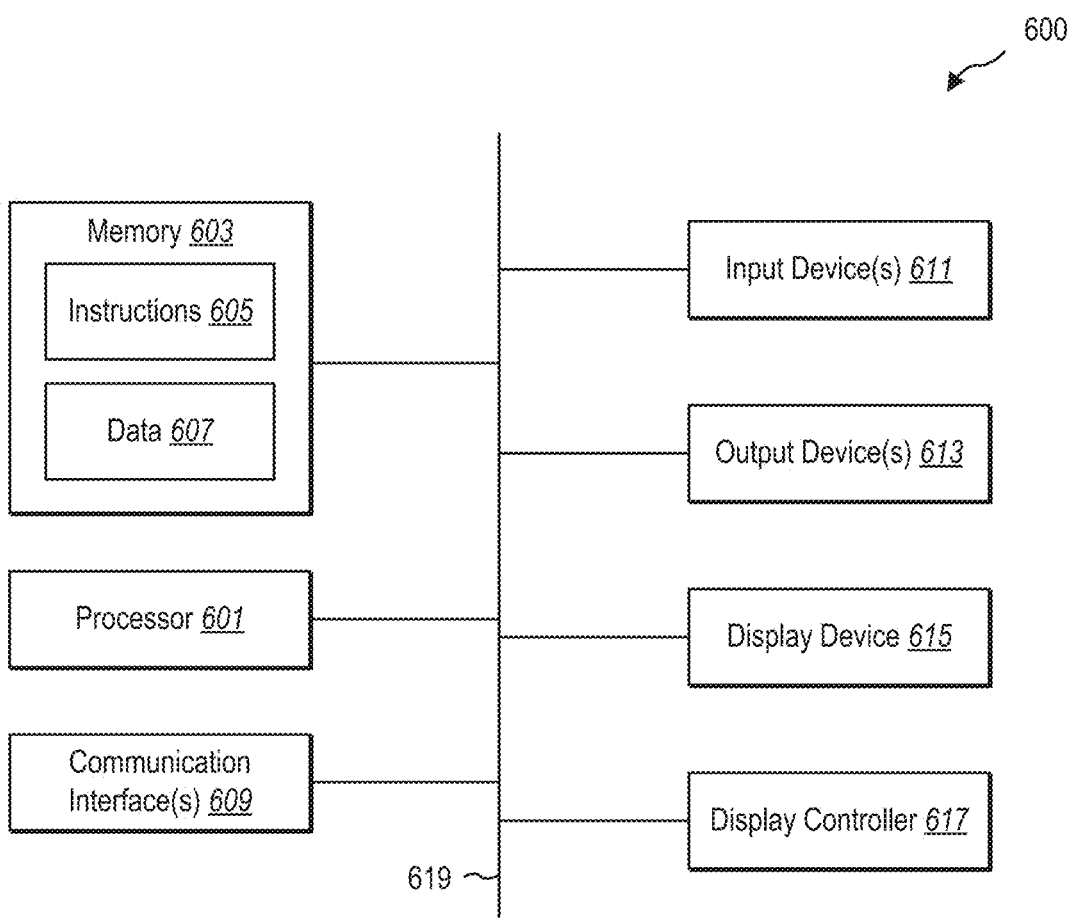
FIG. 6 illustrates components that may be included within a computer system.

FIG. 6 illustrates components that may be included within a computer system 600. One or more computer systems 600 may be used to implement the various methods, devices, components, and/or systems described herein.

The computer system 600 includes a processor 601. The processor 601 may be a general-purpose single or multi-chip microprocessor (e.g., an Advanced RISC (Reduced Instruction Set Computer) Machine (ARM)), a special purpose microprocessor (e.g., a digital signal processor (DSP)), a graphics processing unit (GPU), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

In some implementations, the various components of the computer system 600 are implemented as one device. For example, the various components of the computer system 600 are implemented in a mobile phone or tablet. Another example includes the various components of the computer system 600 implemented in a personal computer. Another example includes the various components of the computer system 600 implemented in the cloud. Another example includes the various components of the computer system 600 implemented on an edge device.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method comprising:
    receiving communication information of a machine learning workload and topology information of a network;
    identifying a communication group for the machine learning workload and a set of flows for the communication group, wherein each flow of the set of flows is a sequence of data packets transferred between a first machine in the network and a second machine in the network over a network connection;
    generating a routing schedule that maps each flow in the set of flows to a path in the network from the first machine in the network to the second machine in the network;
    encoding an application identifier, using the routing schedule, into a packet header of the data packets of each flow, wherein the application identifier identifies the first machine for the data packets and the second machine for the data packets; and
    using the application identifier to route the data packets of each flow on the path mapped to each flow from the first machine to the second machine.

2. The method of claim 1, further comprising:
    using a Collective Communication Library (CCL) plugin to generate the application identifier and embedding the application identifier into the data packets associated with the first machine and the second machine.

3. The method of claim 1, wherein different flows of the set of flows are assigned to different paths in the network to balance an amount of network traffic from the set of flows across the different paths.

4. The method of claim 1, wherein the path includes one or more switches in the network that establish the network connection between the first machine and the second machine.

5. The method of claim 1, wherein the first machine is a graphics processing unit (GPU) and a source of a flow, and the second machine is a GPU and a destination for the flow.

6. The method of claim 1, further comprising:
    extracting, using dynamic code analysis of the machine learning workload, the communication information that includes communication patterns and parallelization strategies of the machine learning workload; and using the communication patterns and the parallelization strategies to identify the set of flows for the machine learning workload.

7. The method of claim 1, further comprising:

using a round-robin algorithm to generate the routing schedule, wherein the round-robin algorithm assigns each flow of the set of flows to different paths in the network one by one.

8. The method of claim 1, further comprising:

using a best-fit algorithm to generate the routing schedule, wherein the best-fit algorithm uses heuristics to assign a best path for each flow.

9. The method of claim 1, wherein the set of flows are assigned to a subset of paths within the network that are reserved exclusively for executing the machine learning workload.

10. The method of claim 1, further comprising:

receiving a notification of a persistent network change;

collecting network change information from switches in the network in response to receiving the notification;

generating an updated routing schedule using the network change information; and using the updated routing schedule to route the data packets of each flow from the first machine to the second machine.

11. The method of claim 1, further comprising:

monitoring a status of the network; and using Equal-Cost Multi-Path (ECMP) failover to redirect the set of flows for the machine learning workload in response to determining the status of the network includes a temporary link failure on paths in the network.

12. The method of claim 1, further comprising:

receiving a second machine learning workload for use on the network;

reserving a first subset of paths within the network for the set of flows for the machine learning workload;

generating the routing schedule that maps each flow in the set of flows to the paths within the first subset of paths from the first machine to the second machine in the network;

reserving a second subset of paths within the network for the set of flows for the second machine learning workload; and generating the routing schedule that maps each flow in the set of flows in the second machine learning workload to paths within the second subset of paths from the first machine to the second machine in the network.

13. The method of claim 12, further comprising:

monitoring a status of the network; and using a plurality of routing tables on each switch in the network to redirect the set of flows for the machine learning workload within the first subset of paths and the set of flows for the second machine learning workload within the second subset of paths in response to determining the status of the network includes a temporary link failure on the paths in the network.

14. A system, comprising:

a memory to store data and instructions; and a processor operable to communicate with the memory, wherein the processor is operable to:

receive communication information of a machine learning workload and topology information of a network;

identify a communication group for the machine learning workload and a set of flows for the communication group, wherein each flow of the set of flows is a sequence of data packets transferred between a first graphics processing unit (GPU) in the network and a second GPU in the network over a network connection;

generate a routing schedule that maps each flow in the set of flows to a path in the network from the first GPU in the network to the second GPU in the network;

encode an application identifier, using the routing schedule, into a packet header of the data packets of each flow, wherein the application identifier identifies the first GPU for the data packets and the second GPU for the data packets; and use the application identifier to route the data packets of each flow on the path mapped to each flow from the first GPU to the second GPU.

15. The system of claim 14, wherein the processor is further operable to use a Collective Communication Library (CCL) plugin to generate the application identifier and embed the application identifier into the data packets associated with the first GPU and the second GPU.

16. The system of claim 14, wherein the processor is further operable to map the set of flows to different paths in the network to balance an amount of network traffic from the set of flows across the different paths.

17. The system of claim 14, wherein the path includes one or more switches in the network that establish the network connection between the first GPU and the second GPU.

18. The system of claim 14, wherein the processor is further operable to:

extract, using dynamic code analysis of the machine learning workload, the communication information that includes communication patterns and parallelization strategies of the machine learning workload; and use the communication patterns and the parallelization strategies to identify the set of flows for the machine learning workload.

19. The system of claim 14, wherein the processor is further operable to assign the set of flows to a subset of paths within the network that are reserved exclusively for executing the machine learning workload.

20. The system of claim 14, wherein the processor is further operable to:

receive a notification of a persistent network change;

collect network change information from switches in the network in response to receiving the notification;

generate an updated routing schedule using the network change information; and use the updated routing schedule to route the data packets of each flow from the first GPU to the second GPU.

* * * * *